United States Patent
Bredt et al.

(10) Patent No.: US 10,435,535 B2
(45) Date of Patent: Oct. 8, 2019

(54) MATERIAL SYSTEM AND METHOD FOR FABRICATING REFRACTORY MATERIAL-BASED 3D PRINTED OBJECTS

(71) Applicant: 3Dbotics, Inc., Dearborn, MI (US)

(72) Inventors: James F. Bredt, Watertown, MA (US); Kenneth R. Strausbaugh, London, OH (US); Michael Thomas Woods Lis, North Andover, MA (US)

(73) Assignee: 3Dbotics, Inc., Dearborn, MI (US)

( * ) Notice: Subject to any disclaimer, the term of this patent is extended or adjusted under 35 U.S.C. 154(b) by 131 days.

(21) Appl. No.: 15/267,327

(22) Filed: Sep. 16, 2016

(65) Prior Publication Data

US 2017/0081500 A1    Mar. 23, 2017

Related U.S. Application Data

(60) Provisional application No. 62/219,915, filed on Sep. 17, 2015.

(51) Int. Cl.

| | | |
|---|---|---|
| *C08K 3/36* | (2006.01) | |
| *B01J 31/02* | (2006.01) | |
| *C08B 5/14* | (2006.01) | |
| *C08B 31/06* | (2006.01) | |
| *C09D 11/102* | (2014.01) | |
| *C09D 101/16* | (2006.01) | |
| *C09D 103/06* | (2006.01) | |
| *C09D 173/00* | (2006.01) | |
| *C09D 11/08* | (2006.01) | |
| *C09D 11/322* | (2014.01) | |
| *C09D 11/36* | (2014.01) | |
| *C09D 11/38* | (2014.01) | |
| *C09D 11/14* | (2006.01) | |
| *B33Y 10/00* | (2015.01) | |
| *B33Y 70/00* | (2015.01) | |
| *B29K 509/00* | (2006.01) | |
| *B29C 64/165* | (2017.01) | |

(52) U.S. Cl.
CPC ............ *C08K 3/36* (2013.01); *B01J 31/0225* (2013.01); *C08B 5/14* (2013.01); *C08B 31/063* (2013.01); *C09D 11/102* (2013.01); *C09D 101/16* (2013.01); *C09D 103/06* (2013.01); *C09D 173/00* (2013.01); *B29K 2509/00* (2013.01); *B33Y 10/00* (2014.12); *B33Y 70/00* (2014.12)

(58) Field of Classification Search
CPC .. B01J 31/0225; B29C 64/165; B29C 64/171; B33Y 10/00; B33Y 70/00; C08K 3/36
See application file for complete search history.

(56) References Cited

U.S. PATENT DOCUMENTS

| | | |
|---|---|---|
| 6,423,255 B1 | 7/2002 | Hoechsmann et al. |
| 7,678,528 B2 | 3/2010 | Rahman et al. |
| 7,807,077 B2 | 10/2010 | Hochsmann et al. |
| 2005/0017394 A1* | 1/2005 | Hochsmann ............ B33Y 10/00 264/113 |
| 2009/0047430 A1 | 2/2009 | Mori et al. |
| 2010/0279007 A1 | 11/2010 | Briselden et al. |
| 2013/0245319 A1* | 9/2013 | Bosmann ................. C07C 51/23 562/531 |

FOREIGN PATENT DOCUMENTS

| | | |
|---|---|---|
| EP | 1524098 A1 | 4/2005 |
| EP | 1415792 B1 | 4/2014 |
| WO | 2011157732 A1 | 12/2011 |
| WO | 2014093624 A1 | 6/2014 |

OTHER PUBLICATIONS

International Search Report and Written Opinion dated Feb. 3, 2017.
Extended European Search Report dated Apr. 23, 2019 for EP App. No. 16847360.1.

* cited by examiner

*Primary Examiner* — Stella K Yi
(74) *Attorney, Agent, or Firm* — Hansen IP Law PLLC

(57) ABSTRACT

A material system and method for bonding refractory powders in a three dimensional printer. A first particulate component including a refractory material is mixed with a first reactive component to form a particulate mixture. A flat layer of the particulate mixture is dispensed onto a build surface. A liquid binder, which may include a furan monomer and a surfactant, is dispensed by an ink-jet printhead onto the particulate mixture. The particulate mixture may contain a furan-soluble polymer that imposes a capillary attraction for the liquid binder, keeping it situated in the immediate vicinity of where the binder is dispensed. Additionally it provides a sufficient catalytic power to co-polymerize with the furan monomer and form a solid structure. This enables a 3D printer to build strong, accurate parts with high packing density, and to reuse the feed material many times in the printer.

43 Claims, No Drawings

MATERIAL SYSTEM AND METHOD FOR FABRICATING REFRACTORY MATERIAL-BASED 3D PRINTED OBJECTS

CROSS-REFERENCE TO RELATED APPLICATIONS

This application claims the benefit of U.S. Provisional Patent Application No. 62/219,915, filed on Sep. 17, 2015, the entirety of which is hereby incorporated by reference.

BACKGROUND

Fabrication of molds and cores for metal casting was the application for which the inkjet-on-powder process for 3D printing was originally invented. Sachs, et. al. (U.S. Pat. No. 5,204,055) coined the term "Three Dimensional Printing" and taught the process as a method for fabricating metal casting molds and cores. The inventors specifically mention the use of organic resin adhesives in this patent (Col. 7 lines 34-44) for purposes of bonding ceramic powders, of which foundry sand is an obvious example. In the original embodiment, the adhesive that bonds together the particulate material is a component of the liquid binder that passes through the jets of the printing element (see col. 5, lines 39-50.) Later, Bredt (U.S. Pat. No. 5,851,465) taught a method and reactive materials system that included the printing of an adhesive-containing liquid binder (in this case colloidal silica) onto a ceramic powdered substrate containing a catalyst (in this case an acid) that caused the binder to solidify in a relatively short period of time, bonding the ceramic grains together by adhesion of silica gel, the product of coagulation of colloidal silica with an acid. Kasperchik et. al. (U.S. Pat. No. 6,742,456) taught a "crosslinking" reaction derived from acid-base cement chemistry.

Van der Geest (U.S. Pat. No. 6,403,002) disclosed a preferred sequence of operations for this style of 3D Printing: Applying a first material to a build bed, selectively applying a second material to the first material, curing the product, and repeating the steps. A soluble, solid adhesive was combined with an inert filler such as sand to form the first material, and the second material included a solvent (e.g., water and a flow promoter or "carrier"). Van der Geest's motivation for removing the adhesive component from the printed fluid was to enhance the reliability of the printing process (col. 1, lines 21-26) when a "conventional inkjet printer" is adapted for 3D Printing.

The commercialized versions of the process embodied by Sachs et. al. have long been divided into two camps. One, using repurposed desktop printing hardware, may be represented by van der Geest and various early products marketed by Z Corporation, such as the ZPrinter 510. In these machines, printheads were considered to be consumable, and only cursory effort was made to maintain cleanliness of the printing elements. In the other camp, industrial printing equipment was developed using more expensive but more reliable printing hardware. Products manufactured by VoxelJet and EXOne are examples of these. In this second camp, reactive binders and monomers are quite feasible to print through the industrial inkjet printheads, as long as sufficient effort is made to keep the aggressive reagents from corroding or solidifying the printing elements. This adds to the cost of the machine, but makes it much more adaptable to the industrial environment.

Brodkin et al. (U.S. Pat. No. 6,322,728) disclose methods for binding ceramic powders (including silica, alumina, mullite, spinel and zirconia) by printing a reactive monomer (acrylic and methacrylic acids) containing a free-radical initiator that may be photo-sensitive or heat-sensitive. Williams discloses a further technique in which a free-radical initiator is mixed with the particulate substrate and an acrylic monomer is printed from an inkjet printhead to form a three dimensional article.

Davidson et al. (U.S. Pat. No. 7,037,382) disclose methods for recirculating the granular medium within a 3D Printer, allowing the granular material to be reused from one build to the next. The advantages to recycling the unused materials in a 3D printing process are quite attractive. Besides saving on the cost of new materials, one reduces the handling and disposal of a toxic waste stream emerging from a 3D printer that adds to the cost of operation.

Furan

As used herein, the term "furan monomer" refers to polymerizable compounds with one or more furan rings, including furfuryl alcohol, oligomers of furfuryl alcohol, furfural, 2,5 bis-hydroxymethyl furan, mixtures thereof, as well as combinations with formaldehyde, paraformaldehyde, resorcinol, catechol, cashew nut shell oil and various phenolic compounds which are well known and widely used in the chemical industry. Acidic catalysts for polymerizing furan monomers are well known and widely used in the chemical industry. In a comprehensive review of the state of the art in the middle of the last century, Dunlop and Peters (The Furans, Reinholt Publ. Co, 1953.) describe the catalysis and resinification of furfuryl alcohol (pp. 783-784) and furfural (pp. 395-399) by strong acids. Dunlop and Peters note, on p. 784, that cellulose is incompatible with the strong acid catalysts used with furfuryl alcohol because the cellulose undergoes some chemical degradation. They also note (p. 785) that furfuryl alcohol in combination with formaldehyde may be catalyzed by weaker acids than furfuryl alcohol by itself. They mention (p. 225) that formic acid is capable of catalyzing furfuryl alcohol. Dunlop and Peters (pp. 769-770) discuss the use of furfuryl alcohol and furfural as the basis for paint stripping preparations, indicating their utility for dissolving polymers.

Preferred homogeneous catalysts for polymerization of furfuryl alcohol are sulfuric acid, sulfurous acid, methanesulfonic acid, and aryl sulfonic acids such as benzenesulfonic acid, xylenesulfonic acid and toluenesulfonic acid. See, for example, Hochstmann and Ederer, U.S. Pat. No. 7,807, 077, Col. 5, lines 23-28. These are irritating, corrosive, toxic, and carcinogenic substances that pose handling and disposal problems through the entire process stream.

Alternative catalysts are described in U.S. Pat. No. 4,495, 316 (fluoride salts) and U.S. Pat. No. 4,543,373 ($CuCl_2$ and $ZnCl_2$ as accelerators in conjunction with a sulfonic acid.) U.S. Pat. No. 5,607,986 describes the use of "latent acids" examples of which are metal salts such as copper toluene sulfonate that cure the resin at elevated temperatures.

Many of these formulations contain formaldehyde in combination with the furan monomer, and more recent inventions have focused on removing formaldehyde from the product. In U.S. Pat. No. 6,391,942, the inventors use a combination of furfuryl alcohol with a condensed reactive resin including polymerized bis-hydroxymethyl furan, resorcinol and bisphenol-A. The preferred catalyst is a mixture of a Lewis acid and a more conventional acid catalyst such as sulfuric acid or benzenesulfonic acid. Suitable Lewis acids are $CuCl_2$, $ZnCl_2$, and $FeCl_3$.

Furan in 3D Printing

The use of acid-catalyzed furan resins for 3D Printing of metal-casting molds was taught by Ederer and Hochstmann (U.S. Pat. Nos. 7,531,117, and 7,955,537) and Hochtsmann and Ederer (U.S. Pat. No. 7,807,077.) In the first, a monomer (e.g., furfuryl alcohol) is mixed with a sand prior to the deposition of a curing agent (e.g., sulphurous acid) by a patterning method such as ink-jet printing. In the second and third, a particulate material is coated with acid, and subsequently a binder including furfuryl alcohol is dispensed by an ink-jet printer in a pattern. One drawback of these three techniques is that the reactive component that is combined with the particulate must be mixed in such a way as to form a continuous coating on the grains of the particulate prior to contacting the reactive component that is dispensed by the 3D printer. The volume of coated particles tends to be porous, and each particle has a coating that is reactive with the printed reactive component. Because of the acidic strength of the curing agents that are used, polymerization and cross-linking tends to occur rapidly and progress to the point where the printed reactive component does not get thoroughly distributed through the coated particles, which may prevent some portions of a given layer from solidifying to the desired extent.

Langer et. al. (U.S. Pat. No. 6,155,331) teaches the use of heat to effect bonding of coated sand, and van der Geest teaches a method for accelerating the cure of ink-jet patterned layers on a bed of powder by applying hot air or radiation. These methods are not preferred in a large-scale industrial process for making large 3D printed parts. Heat transfer within a bed of loose sand is notoriously difficult: thermal conduction is very poor, and silica sand (the most commonly used mineral) is highly reflective to infrared radiation. Further, the heating hardware complicates the mechanism and may cause failures of other components of the 3D printer through heat leakage. Further still, furan monomer is relatively volatile, and by heating the sand during printing the binder may evaporate and be driven away from the printed regions and into unprinted regions, causing spurious bonding of sand to the outside surface of the part.

Without wishing to be bound by any theory, it is believed that when the rate of polymerization/crosslinking is too high relative to the rate of printed reactive component migration, the polymerized/crosslinked material impedes the migration of unreacted printed reactive component through the layer of particulate component and catalyst. Again without wishing to be bound by any theory, it is believed that the materials systems and methods described herein improve the extent to which the printed reactive component is distributed through a layer of a particulate component and catalyst by slowing down the rate of polymerization and cross-linking relative to the rate of migration of the printed reactive component through the particulate component layer. In 3D printing, a slower reaction rate is acceptable, even preferred, since shapes may be formed over a period of several hours, and monomer must infiltrate into the pore space of the granular substrate without the aid of external agitation.

A 3D printing method and material system are desired that allow control of the timing of solidification in a two-part reactive system that cures at ambient temperature. Further still, an initiator is desire that poses less of a chemical hazard to equipment, personnel, and the environment.

A problem with the techniques described by Ederer is that the sand mixture is mixed with a first reactive component that is provided as a liquid solution in a solvent carrier. This liquid component contributes to the cohesion of the nominally dry sand component such that the sand cannot pack densely, thereby adding to the porosity of the final material. While porosity, per se, is not undesirable in metal casting molds, a process and material are desired which separate the variables affecting the porosity from those affecting the rate of cure. A need has arisen for a method of catalyzing a furan monomer which has a lesser effect on the mechanical and flow properties of the loose sand prior to printing.

SUMMARY

In a first aspect of the present disclosure, a method for forming a solid object is provided which comprises providing a first mixture comprising a first particulate component and at least one material selected from the group consisting of a carbohydrate, cellulose, starch, dextrin, tannin, phenolic polymer, polymeric tannin, proanthocyanidin, catechol, activated carbon, and derivatives thereof. The method further comprises providing an acid, and combining the first mixture and the acid to form a first reactive component, wherein the first reactive component is a particulate. A substantially flat layer of the first reactive component is dispensed onto a build surface. A liquid binder including a second reactive component is applied onto at least a portion of the flat layer. In certain examples, the first reactive component is combined with a volume of the first particulate component that is devoid of the first reactive component to form the flat layer. One or more of the following features may be included. The first particulate component may be a refractory material, e.g., silica (including sand), a silicate mineral, a silicate glass, a synthetic ceramic, a fibrous ceramic, a granulated porous ceramic, and/or a non-silicate mineral.

The silicate mineral may include or consist essentially of, e.g., olivine, zirconium silicate, magnesium silicate, calcium silicate, aluminum silicate, mullite, sodium silicate, spinel, garnet, and/or perovskite.

The silicate glass may include, consist, or consist essentially of, e.g., fused silica, soda-lime glass, e-glass, borosilicate glass, fused staurolite, and/or fused aluminosilicate.

The synthetic ceramic may include, consist, or consist essentially of, e.g., sodium silicate, Portland cement, calcium aluminate cement, synthetic staurolite, synthetic spinel, and synthetic garnet, silicon carbide, silicon nitride, boron carbide, graphite and/or amorphous carbon.

The fibrous ceramic may include or consist essentially of, e.g., glass fiber, fused silica fiber, aluminosilicate fiber, silicon carbide fiber, rock wool, zirconium silicate fiber, asbestos and/or Wollastonite.

The granulated porous ceramic may include or consist essentially of, e.g., silica gel, alumina gel, aluminosilicate gel, zeolite, zirconia gel, clay, bentonite, fireclay ceramic powder, powdered earthenware, chamotte, grog, frit, vermiculite, cinders, calcined bone, and/or diatomaceous earth.

The non-silicate mineral may include or consist essentially of, e.g., gypsum, kieserite, limestone, dolomite, magnesium aluminate, calcium aluminate, iron oxide, titanium dioxide, chromite, forsterite, and/or magnesia.

The step of providing an acid may comprise providing a second mixture comprising the acid, a polar organic solvent, and/or a particulate component, preferably, the particulate component used in the first mixture. The first and second mixtures are combined to form a combined mixture that is allowed to react. The organic solvent is dried from the combined mixture to form the first reactive component. In other examples, the first reactive component may comprise at least one material selected from the group consisting of a carbohydrate, cellulose, starch, dextrin, tannin, phenolic polymer, polymeric tannin, proanthocyanidin, catechol, activated carbon, and derivatives thereof—either with or without a refractory particulate component—which is combined with the acid catalyst, wherein the acid catalyst is preferably provided with a polar organic solvent and is further provided with or without a refractory particulate component.

The polar organic solvent may include, consist, or consist essentially of an alcohol, a ketone, an acid anhydride, a tertiary amine, an amide, and/or a chlorinated solvent.

The alcohol may include, consist, or consist essentially of methanol, ethanol and/or isopropanol.

The ketone may include, consist, or consist essentially of, e.g., acetone and/or methyl ethyl ketone.

The acid anhydride may include, consist, or consist essentially of, e.g., acetic anhydride and/or succinic anhydride.

The tertiary amine may include, consist, or consist essentially of, e.g., pyridine and/or picoline.

The amide may include or consist essentially of dimethylformamide.

The chlorinated solvent may include or consist essentially of chloroform, dichloromethane, and/or trichloroethylene.

The first reactive component may be prepared by combining and reacting a first mixture comprising at least one of a carbohydrate, cellulose, starch, dextrin, tannin, phenolic polymer, polymeric tannin, proanthocyanidin, activated carbon, catechol, and/or derivatives thereof with a second mixture comprising, consisting, or consisting essentially of at least one selected from the group consisting of sulfuric acid, sulfurous acid, and chlorosulfonic acid.

The second reactive component may comprise, consist, or consist essentially of a furan monomer.

The liquid binder may include a surfactant.

In another aspect, embodiments of the invention include a method for forming a solid object. The method includes providing a first reactive component that comprises a first particulate component (e.g., a refractory material) mixed with an acid encapsulated in a microporous encapsulating medium (which may itself be described as a particulate component). Mechanical characteristics of the encapsulated acid do not impart cohesion to the first particulate component. A substantially flat layer of the first reactive component (combined with an additional volume of the first particulate component) is dispensed onto a build surface. A second reactive component, selected from a family of furan monomers, is applied to at least a portion of the substantially flat layer, preferably in a pattern corresponding to a cross-section of a three-dimensional object.

One or more of the following features may be included. The microporous encapsulating media includes, consists, or consists essentially of microcrystalline cellulose, a carbohydrate, polyethylene oxide, a vinyl polymer, rosin, phenolic polymers, tannins, cellulose esters, cellulose ethers, carbohydrate derivatives of ester, carbohydrate derivatives of ether, activated carbon, an oligomeric carbohydrate, and/or derivatives thereof.

The vinyl polymer may include or consist essentially of polyvinyl pyrrolidone ("PVP"), PVP copolymerized with vinyl acetate, butylated PVP, polyvinyl acetate, polyvinyl alcohol, and/or polyvinyl butyral.

The cellulose esters and cellulose ethers may each include or consist essentially of cellulose acetate, nitrocellulose, methyl cellulose, hydroxypropyl cellulose and/or ethyl hydroxyethyl cellulose.

At least one of the carbohydrate derivatives of ester and ether may be derived from starch, dextrin, alginate, pectin, and/or vegetable gum.

The vegetable gum may include or consist essentially of gum Arabic and/or guar.

The oligomeric carbohydrate includes or consists essentially of starch, dextrin, hemicellulose and/or cellulose hydrolyzed with strong acids (acids that substantially completely dissociate in aqueous solutions).

The acid in the first reactive component comprising an encapsulated acid may comprise, consist, or consist essentially of sulfuric acid, sulfurous acid, toluenesulfonic acid, xylenesulfonic acid, methanesulfonic acid, and/or benzenesulfonic acid.

The method may further include allowing the second reactive component to contact a mixture of the first particulate component the first reactive component (i.e., an encapsulated acid) and to substantially come to rest before commencing to react with the first reactive component.

After the second reactive component contacts the first reactive component, the first and second reactive components may be allowed to react and form a crosslinked polymer.

The present disclosure also contemplates providing material systems for 3D printing. In certain examples, a material system for 3D printing may include a first particulate component comprising, consisting, or consisting essentially of a refractory material mixed with a first reactive component, wherein the first reactive component comprises a mixture of (i) the first particulate component, (ii) a at least one of a carbohydrate, cellulose, starch, tannin, phenolic polymer, polymeric tannin, proanthocyanidin, activated carbon, catechol, and derivatives thereof, and (iii) a second mixture comprising an acid catalyst selected from the group consisting of sulfuric acid, sulfurous acid, and chlorosulfonic acid and the first particulate component. In certain examples, the first and/or second mixtures do not include the first particulate component.

The refractory material may comprise, consist, or consist essentially of silica, sand, a silicate mineral, a silicate glass, a synthetic ceramic, a fibrous ceramic, a granulated porous ceramic, and/or a non-silicate mineral.

The silicate mineral may comprise, consist, or consist essentially of olivine, zirconium silicate, magnesium silicate, calcium silicate, aluminum silicate, mullite, staurolite sodium silicate, spinel, garnet, and/or perovskite.

The silicate glass may comprise, consist, or consist essentially of fused silica, soda-lime glass, borosilicate glass, fused staurolite, and/or fused aluminosilicate.

The synthetic ceramic may comprise, consist, or consist essentially of sodium silicate, Portland cement, calcium aluminate cement, synthetic staurolite, synthetic spinel, and synthetic garnet, silicon carbide, silicon nitride, boron carbide, graphite and amorphous carbon.

The fibrous ceramic may comprise, consist, or consist essentially of glass fiber, fused silica fiber, aluminosilicate fiber, silicon carbide fiber, rock wool, zirconium silicate fiber, asbestos, and/or Wollastonite.

The granulated porous ceramic may comprise, consist, or consist essentially of silica gel, alumina gel, aluminosilicate gel, zeolite, zirconia gel, clay, bentonite, fireclay ceramic powder, powdered earthenware, chamotte, grog, frit, vermiculite, cinders, calcined bone, and/or diatomaceous earth.

The non-silicate mineral may comprise, consist, or consist essentially of gypsum, kieserite, limestone, dolomite, magnesium aluminate, calcium aluminate, iron oxide, titanium dioxide, chromite, forsterite, and/or magnesia.

A method of forming the foregoing material system may be provided by forming a first mixture comprising a first particulate component—such as sand—and the at least one of a carbohydrate, cellulose, starch, dextrin, tannin, phenolic polymer, polymeric tannin, proanthocyanidin, activated carbon, catechol, and derivatives thereof is a carbohydrate. The method comprises the steps of forming a second mixture comprising an acid, the first particulate component, and an organic solvent selected from the group consisting of acetone, acetic anhydride, alcohol, methanol, and isopropanol. The first and second mixtures are combined to form a combined mixture and are allowed to react. The organic solvent from the combined mixture is dried to form the first reactive component.

The acid in the second mixture may comprise, consist, or consist essentially of sulfuric acid, sulfurous acid, and chlorosulfonic acid.

The material system may include a liquid binder including a second reactive component, e.g., a furan monomer.

In yet another aspect, a method of forming a solid object is provided which comprises preparing a first reactive component by reacting an acid with at least one of a carbohydrate, cellulose, starch, dextrin, tannin, phenolic polymer, polymeric tannin, proanthocyanidin, activated carbon, catechol, and derivatives thereof, dispensing a substantially flat layer of the first reactive component onto a build surface, and applying a liquid binder comprising a second reactive component onto at least a portion of the flat layer. In certain preferred examples, the acid is not combined with a particulate component before the reacting step. In the same or other examples, the at least one of a carbohydrate, cellulose, starch, dextrin, tannin, phenolic polymer, polymeric tannin, proanthocyanidin, activated carbon, catechol, and derivatives thereof is not combined with a particulate component before the reacting step. In the same or other examples, neither the acid nor the at least one of a carbohydrate, cellulose, starch, dextrin, tannin, phenolic polymer, polymeric tannin, proanthocyanidin, activated carbon, catechol, and derivatives thereof is combined with a particulate component before the reacting step. In the same or other examples, the first reactive component is substantially dry and/or is a particulate component at the beginning of the applying a liquid binder step. In the same or other examples, the second reactive component is a furan monomer.

DETAILED DESCRIPTION

Embodiments of the present disclosure relate to a method and a materials system based on acid-catalyzed furan monomers mixed with refractory particulate material (e.g., foundry sand); the relative proportions of the reactive components and their rates of reaction may be controlled independently.

The word "binder" is used hereinafter to describe a fluid component in the instant invention that is jetted through an ink-jet printhead and is capable of being caused to solidify by a chemical reaction with components contained in the granular substrate. Sachs et. al. used the word "binder" for the fluid component that is jetted onto the powdered substrate. This term has become standard in the 3D printing industry, whether or not the "binder" possesses any real adhesive qualities or not. In the metal-casting industry, the word "binder" is used consistently to describe an adhesive used to bond together sand in sand molds. In the present disclosure, the fluid that is jetted comprises, in its majority, a fluid adhesive that is familiar to the foundry industry as a "binder" in that industry. Therefore, it constitutes a "binder" in both senses of the word.

In the chemical industry the word "catalyst" is used to describe a substance that facilitates a chemical reaction between other substances without itself being consumed in the process. They have a very wide variety of structures, and polymeric catalysts are known. (See W. Ford, Polymeric Reagents and Catalysts, ACS Symposium Series, 1986, Ch. 1.) For many chemical reactions it is possible (and economically necessary) to recover the catalyst and reuse it either in a continuous process or in a batch process. In embodiments of the instant invention and in much of the related prior art, no effort is made to recover any reactive substances, and therefore there is no way to tell whether or not these substances are consumed by the reaction and whether or not they are irreversibly bound to the overall structure. It is therefore impossible to determine whether or not certain substances described as catalysts in the prior art satisfy the definition of the word.

To partly resolve this ambiguity, the word "initiator" is used herein to describe a chemical substance that is combined with a liquid monomeric binder to engender its solidification, and is itself consumed in the chemical reaction and forms a chemically bonded portion of the overall structure of the product. An initiator may itself be a single chemical substance, a mixture of several substances or it may be the product of a chemical reaction that is performed prior to the blending of materials that are used to feed a 3D printer. Thus, in certain examples in which the initiator is not encapsulated, preferred initiators include sulfuric acid, sulfurous acid, and chlorosulfonic acid.

As used herein, refractory materials are non-metallic materials having those chemical and physical properties that make them applicable for structures, or as components of systems, that are exposed to environments above 1,000° F.

Embodiments of the present disclosure utilize a furan monomer as part of the second reactive component. It is important to note that the monomers described by Williams above polymerize by free-radical addition polymerization, while furfuryl alcohol is believed to polymerise through a cationic addition polymerization. See Kim et. al., Chem Cat Chem 2011, 3, 1451-1458. In the reaction of Williams the initiator becomes incorporated into one end of the polymer chain and a 'free radical' or unpaired electron reacts with monomer molecules in sequence, adding them to the chain. In a cationic polymerization, an electron acceptor initiates the reaction and a positive ionic charge center propagates down the growing chain.

One of the features of embodiments of present disclosure is the initiator in the granular substrate of the first reactive component may be formulated in such a way that it is prevented from being ejected from the substrate during printing, and therefore does not accidentally combine with the binder to create solid deposits on the printhead.

Embodiments of the present disclosure make use of heterogeneous catalysts that include catalytic moieties attached to a supporting structure. The supporting structure can be in the form of a soluble polymeric molecular backbone or a porous, inert support material.

Catalysts based on inorganic metal salts are less desirable in a foundry process in which the granular material is to be reclaimed. The conventional technique for reclaiming foundry sand is to calcine it at about 800 C, burning out volatiles and organic resins. Materials in accordance with embodiments of the instant invention, besides being free of formaldehyde, utilize no transition metal salts that may persist after calcination.

Embodiments of the present disclosure utilize a dry reactive component, referred to herein as an initiator, which does not impart these undesirable volatilization qualities. The initiator is a dry particulate that has little or no effect on the cohesion of the sand; it does not have volatile components that affect its pot life; it is noncorrosive and far less irritating than unmodified sulfonic and sulfuric acids; and it modulates the rate of reaction in such a way that the material is very tolerant to variations in the mixing proportions.

The initiator (acid) component of the second mixture of the first reactive component remains segregated into discrete particles—that are more densely packed and which have a lower porosity than certain known methods—until the initiator dissolves in the binder. It is believed, therefore, that the initiator has little effect on the binder viscosity until well after the binder is thoroughly distributed through the layer comprising the first reactive component combined with the first particulate component (i.e., an additional amount of the first particulate component beyond that which may be used to form the first reactive component). The solidification occurs by a two-stage process: in the first stage the dry particles of an initiator dissolve in the monomer and diffuse away from their points of origin. In the second stage the reactive (or catalytic) moieties bonded to the initiator molecules reach a large enough local concentration that they trigger the polymerization of the binder.

In another embodiment, the first reactive component comprises a more conventional acidic catalyst (initiator) is encapsulated in a soluble or porous encapsulant. The first reactive component is mixed with a volume of the first (refractory) particulate component and formed into a thin layer onto which the second reactive component is printed. The encapsulated initiator is dry and does not affect the cohesion of the bulk substrate. Solidification is still a two-stage process. In the first stage, the capsules become wetted with binder and the catalyst (initiator) diffuses away from the capsules, mixing with the liquid binder in the pore volume of the first particulate component (e.g., sand). The binder remains liquid until it reaches the second stage of the reaction. In the second stage, the catalyst reaches a high enough local concentration to trigger solidification of the monomer.

In known techniques such as those of Ederer and Hochtsmann, when preparing the coated sand mixture prior to use in a 3D printer, the pore space of the sand may become inoculated with liquid, forming a continuous network of liquid menisci throughout the pore space. These provide easy pathways for liquid migration outside of the bounds of the part. In dry sand, on the other hand, fluid migrates by a discontinuous series of jumps, called "Haines" jumps, that greatly retard advancing flow. See Bredt, "Binder Stability and Powder/Binder Interaction in Three Dimensional Printing," MIT Thesis, Mech. E., 1995, pp. 170-172.

A method for forming a solid 3D printable structure is desired that possesses independently controllable properties of cohesion, rate of fluid migration, and reaction time. Furan monomers are widely accepted in the foundry industry as sand binders, and therefore embodiments of this invention are directed towards that chemistry set.

Furan monomers are particularly effective solvents for many materials that provide some adhesive and/or rheological benefits during the short period of time between impact of the fluid droplets and their ultimate reaction with the catalyst.

Polymers that have been found to be soluble in furfuryl alcohol include polyethylene oxide, polyvinyl pyrrolidone (pvp) and several of its derivatives such as pvp copolymerized with vinyl acetate, and butylated pvp, polyvinyl acetate and its hydrolyzed forms including polyvinyl alcohol, polyvinyl butyral, rosin, phenolic polymers, tannins, cellulose esters and ethers including cellulose acetate, nitrocellulose, methyl cellulose, hydroxypropyl cellulose and ethyl hydroxyethyl cellulose; as well as analogs of these cellulose compounds based on other carbohydrates such as starch, dextrin, alginate, pectin, and various vegetable gums such as gum Arabic or guar. Oligomeric substances such as starch, dextrin, hemicellulose and cellulose hydrolyzed with strong acids have also been found to be soluble.

Dry Soluble Fillers as Sand Additives

Van der Geest discloses the printing of a solvent onto a dry adhesive powder with a filler. Williams (U.S. Pat. No. 7,905,951) discloses the use of a reactive monomer (acrylic and methacrylic) in the role of a solvent to dissolve a dry polymer incorporated into the powdered substrate. Williams discusses (Col. 5, lines 53-66) the function of this soluble polymeric powder to limit the capillary migration of the monomer away from the point of impact of the liquid droplets.

Furan is conventionally catalyzed by strong acids, e.g., benzenesulfonic acid, sulfuric acid, sulfurous acid, methanesulfonic acid, xylenesulfonic acid, and toluenesulfonic acid. Accordingly, polymers with nucleophilic sites (Lewis bases such as amines and carboxylate anions) are to be avoided because they will tend to neutralize the cationic (carbocation) reactive end of the growing chain and terminate the polymerization. Preferred is a soluble polymer with electrophilic (Lewis-acid) sites that may participate in the catalysis of the reaction.

In certain preferred examples herein, instead of using a homogeneous catalyst (as represented by the strong acids used conventionally), a heterogeneous catalyst is employed which comprises a heterogeneous, oligomeric polymer that functions as the second part of a two-part reactive system. Examples of two-part reactive systems are well-known in polymer chemistry: most epoxy resins use a two-part system, as do most polyurethanes. The strategy is to provide two components that are mutually soluble that react slowly enough that they do not react until they are fully mixed.

One example of such a heterogeneous, oligomeric polymer of the types suitable for the methods described herein is cellulose sulfate, which is the reaction product of sulfuric acid or chlorosulfonic acid and cellulose. Analogs made from other carbohydrates such as starch, are also suitable. Cellulose sulfate is dry, safe to handle, and reusable in many instances. The reaction between sulfuric acid and microcrystalline cellulose (MCC) has been detailed by Ioelovich. (ISRN Chemical Engineering, Volume 2012 Article ID 428974) While MCC is oxidized and decomposed by aqueous concentrated sulfuric acid above 65%, the dissolution and rate of reaction is negligible below 50% $H_2SO_4$. Thus, direct reaction of cellulose with aqueous $H_2SO_4$ between 50% and 65% by weight produces a water-soluble ester with a modest degree of hydrolysis. Rigby (U.S. Pat. No. 2,025,073) discloses the reaction of cellulose with pyrosulfuric acid in tertiary amines such as pyridine. Substitution of various carbohydrates and cellulose derivatives is discussed. Klug and Sperlin (U.S. Pat. No. 2,714,591) describe a method for producing water-soluble cellulose sulfate by direct reaction of wood pulp with 40% $H_2SO_4$ in glacial acetic acid. Cellulose sulfate may also be prepared by reaction of cellulose with chlorosulfonic acid ($ClSO_3H$). Cremlyn (*Chlorosulfonic Acid, A Useful Reagent*, Royal Society of Chemistry, c2002, Section 5.3.2) describes a whole set of reactions of various carbohydrates with $ClSO_3H$ in pyridine, 2-picoline, chloroform, and dimethyl formamide. To this list Rigby also added lutidine, collidine, quinolone, ethylpyridine, conyrine, dimethylaniline, diethylaniline, tri-n-butylamine and dimethylcyclohexylamine. These reactions yield sulfate esters of the various carbohydrates, and their catalytic activity has been noted. See Vekaria and Patel, ARKIVOC 2015 (i) 136-159, http://www.arkat-usa.org/get-file/52695/; Shaabani and Maleki, Applied Catalysis A, vol. 331 (2007) 149-151; and Shaterian et. al. Chem. Sci. Trans., 2012, 1(1), 155-161. http://www.e-journals.in/PDF/V1N1/155-161.pdf. Vakeria and Patel advertise several organic reactions catalyzed by cellulose and starch sulfates (prepared using $ClSO_3H$) and relate that its catalytic activity is better than that of toluenesulfonic acid.

In certain examples, the second mixture used to form the first reactive component also comprises a solvent (diluent). As a diluent for sulfuric acid, sulfurous acid, or chlorosulfonic acid to modify the rate of reaction with cellulose, starch, another carbohydrate or a phenol, catechol, or tannin; one may in fact use any of a variety of liquid nonaqueous solvents that are resistant to reaction with the acid. Solvents that may be used include an alcohol, a ketone, an acid anhydride, a tertiary amine, an amide, or a chlorinated solvent. A suitable alcohol is, e.g., methanol, ethanol, or isopropanol. A suitable ketone is comprising acetone or methyl ethyl ketone. The acid anhydride may be, e.g., acetic anhydride or succinic anhydride. The amines may be pyridine or picoline. A suitable amide is dimethylformamide. The chlorinated solvent may be chloroform, dichloromethane, or trichloroethylene.

Hydrolysis of a carbohydrate produces a softer, more soluble oligomeric product. The use of maltodexrin, the product of hydrolysis of corn starch, has been disclosed by Bredt and Anderson in U.S. Pat. No. 5,902,441. In Col 6, lines 46-48 of that patent, they describe how the dissolution of this soluble oligomeric substance helps to confine the migration of the 3D printed solvent to regions very close to their original point of application. Such an effect is sought to confine a furan monomer printed in similar fashion onto foundry sand. As noted above, furfuryl alcohol possesses a good solvent capacity for polymeric substances (i.e., its use as a paint stripper) and therefore one may reasonably seek a polymeric or oligomeric additive to confine furan monomers to their point of application. This is particularly useful in 3-D printing applications because the point of application corresponds to data describing the three-dimensional object, and any reaction of the furan monomers occurring away from the point of application may cause distortions in the resulting object relative to the data that defines it.

A preferred second reactive component, i.e., the reactive furan monomer, dispensed dropwise over the granular media has two functions: that of a solvent on a brief time-scale after printing, and that of a polymerizable species over longer times. One may choose a time horizon at which these two functions are sequenced by sequestering the catalytic moieties into a structure that only permits a reaction after a short time delay, thereby better ensuring that the polymerization/cross-linking reactions occur at the desired locations dictated by the object data. In accordance with the present disclosure, there are two strategies for effecting the sequence of phenomena described in the foregoing paragraph: 1) provide a catalyst that is encapsulated in a porous or soluble capsule; and 2) provide a soluble, oligomeric material that is chemically combined with a catalyst which reacts only after the oligomer has dissolved in the monomeric liquid.

With respect to the first strategy, the furfuryl-soluble polymers listed may be used to provide an encapsulating medium for the catalyst. Encapsulated catalysts for furan monomers include, but are not limited to, strong sulfonic acids such as benzenesulfonic acid, xylene sulfonic acid, and toluene sulfonic acid, and sulfurous acid, as well as sulfuric acid. In certain examples, these highly reactive, irritating, toxic, and carcinogenic additives are added (according to Ederer and Hochtsmann (U.S. Pat. No. 7,955,537, col. 6, lines 55-61) at a concentration between 0.18 and 0.75 percent by weight to silica sand.

With respect to the second strategy, in accordance with one example, a carbohydrate is reacted with a strong mineral acid, e.g., sulfuric acid, sulfurous acid, or chlorosulfonic acid, on an inert support of silica sand or some other appropriate refractory particulate support such as silica gel, vermiculite, fireclay or other porous ceramic to form a hydrolyzed oligomeric heterogeneous catalyst that is chemically distinct from either of the two reagents used to form it. The inert support is needed only to dissipate the heat of reaction and to ease the handling of the reacting species. This polymeric substance possesses some of the catalytic activity of the strong acid, but in a form that is covalently bonded to the polymeric backbone of the carbohydrate. Carbohydrates possess multiple hydroxy groups on their chains that are preferred sites for attachment of the acid groups. Alternatively, a phenolic polymer, a tannin, a proanthocyanidin (condensed oligomeric tannin), a catechol, activated carbon, urushiol, or cashew shell oil may be used, all of which also possess active hydroxy groups. An example is Silvateam QSF, an extract from the heartwood of the Quebracho tree. Other soluble polymers possessing hydroxy groups such as polyvinyl alcohol may be used as well. However, as discussed further herein, in other examples, the carbohydrate (or the alternatives such as a phenolic polymer, a tannin, a proanthocyanidin, a catechol, activated carbon, urushiol, cashew shell oil, or derivatives thereof may be used, is reacted with the acid without first mixing either or both of the acid or any of the carbohydrate, etc. with an inert support.

The carbohydrate becomes hydrolyzed (by reaction with the acid) into various short-chain residues that are themselves soluble in furan monomers. The product of reaction between the acid and the carbohydrate is a dry powder with low acidity when the reaction is performed within a support of 90 wt % silica sand. It can be handled safely in use and for chemical disposal. It is noncorrosive, non-dusty, and non-irritating to workers who take only modest safety precautions consistent with the handling of silica sand in a conventional foundry.

This reaction product (referred to elsewhere herein as the "first reactive component" after any solvents are removed elsewhere herein) is formed by combining the "first mixture" of a refractory particulate component and the oligomer or polymer and a "second mixture" of the refractory particulate component and the strong acid. The first reactive component may be a first component (an initiator) of a two-part 3D printable materials system. In certain examples, the first reactive component is mixed at a percentage of about 0.5% to 5% by weight, preferably 1% to 4% by weight, and most preferably 2% with a refractory particulate component (e.g., dry foundry sand) to form a mixture that is layered in a 3D printer. A second reactive component, or binder, of the 3D printable materials system of embodiments of the instant invention may include a furan monomer mixed with a quantity of surfactant, most preferably 0.02% of Surfynol 465.

During 3D printing, the second reactive component is preferably dispensed through an inkjet printhead onto a planar substrate formed by dispensing and leveling a quantity of the layered mixture of the first particulate component and the first reactive component to form a cross-section of a three dimensional article. Following the dispensing and leveling step, the inkjet traverses the dispensed and leveled particulate component/first reactive component layer in one direction and dispenses the second reactive component in the form of ink droplets along another direction in a pattern corresponding to data describing the three-dimensional object. In preferred examples, the second reactive component is thoroughly distributed within the layer of the particulate component/first reactive component before polymerization and crosslinking are substantially complete, and more preferably, before polymerization and crosslinking have substantially begun. The soluble ingredients of the first reactive component are allowed to dissolve into the second reactive component, diffuse away from the inert support grains (first particulate component), and react with the monomer of the second reactive component. The combination of the soluble carbohydrate-based first reactive component and the monomeric liquid second reactive component forms a solid polymer that bonds, over a period of a few minutes to a few hours, the bulk of the first particulate component grains into a solid structure that may be used as a core or mold component in a foundry to manufacture a cast metal article.

Example 1: Encapsulated Catalyst (Initiator)—Toluenesulfonic Acid Catalyst Plus Microcrystalline Cellulose A conventional liquid catalyst, BW70 from HA international (approximately 70% benzenesulfonic acid, BSA, In water) is mixed with silica sand (first particulate component) and dry microcrystalline cellulose (Avicel) (polymeric component) in proportions of 0.12% BSA, 0.01% sulfuric acid, and 0.10% microcrystalline cellulose, and the balance of silica sand to yield an encapsulated first reactive component. This mixture is fed into a Viridis3D RAM260 three dimensional printer along with an additional volume of the first particulate component that is devoid of the polymeric component or the catalyst. The second reactive component is dispensed by the 3072 parallel ink-jets on this printer and is furfuryl alcohol (Chem-Rez Fury 454 from ASK Chemicals) with 0.02% Surfynol 465 from Air Products. About 1% by weight of furfuryl alcohol is combined with a quantity of the diluted sand mixture to form a set of 3D printed parts.

Components printed using this method solidify within about two hours, but the furfuryl alcohol monomer is found to 'bleed' (i.e., migrate through capillary attraction) by about 2 mm outside of the regions directly addressed by the 3D printer. This level of dimensional accuracy is unacceptable for this application. It indicates that the Avicel encapsulant by itself is insufficient to provide sufficient capillary attraction to confine furfuryl alcohol in foundry sand fur purposes of 3D printing, which compromises the dimensional accuracy of the part relative to the object data that defines it.

Example 2: Non-Encapsulated Reaction Product of Catalyst and Polymer/Oligomer—Cellulose Sulfate Microcrystalline cellulose (Avicel) with a mean grain size of 50 um was reacted with sulfuric acid in the following manner: A first mixture including 0.625 kg microcrystalline cellulose and 2.25 kg silica sand is combined with a second mixture including 0.375 kg concentrate sulfuric acid, 0.75 kg acetone, and 6.75 kg silica sand to yield a combined mixture. The combined batch was allowed to stand, covered, overnight. The product of this reaction was dried to remove the acetone and form 10 kg of dry sand-supported hydrolyzed cellulose sulfate with approximately 10% by weight of active ingredient (i.e., the first reactive component).

The first reactive component (dry sand-supported hydrolyzed cellulose sulfate) is first tested by mixing 50% by weight of the product with 50% by weight of furfuryl alcohol (second reactive component) in a plastic container. The mixture is found to react vigorously and solidify in a few minutes. As a second test, the dry sand-supported hydrolyzed cellulose sulfate product is loosely mixed with 490 kg of dry silica sand (thereby diluting the active portion of the sand down to 0.2% by weight) and fed into a Viridis3D RAM260 three dimensional printer. The binder component (second reactive component) dispensed by the 3072 parallel ink-jets on this printer is furfuryl alcohol (Chem-Rez Fury 454 from ASK Chemicals) with 0.02% Surfynol 465 from Air Products. About 1% by weight of furfuryl alcohol is combined with a quantity of the diluted sand mixture to form a set of 3D printed parts.

After solidification, the loose unprinted sand is removed from the build area of the 3D printer. Dimensional measurements on 3D printed parts shows that the accuracy of the printed parts is within a tolerance of about 0.5 mm, with no bulk shrinkage, and 'bleed' of the furan monomer confined to about 0.5 mm of the printed regions. The printed material has a strength of 1.0 Mpa and about 1.8% loss on ignition. Components built from this mixture are used as a mold and core set for a ductile iron casting. The improvement relative to Example 1 is believed to be attributable to the use of the reaction product of a polymer or oligomer with the catalyst as the first reactive component instead of an encapsulated catalyst.

Example 3: Starch Sulfate

Food-grade corn starch is reacted with sulfuric acid in the same proportions and the same process as the foregoing example to yield a first reactive component. The product is tested by mixing 50% by weight of this product with 50% by weight of furfuryl alcohol in a plastic container. The mixture is found to react somewhat less vigorously than the cellulose mixture described above, but still solidifies within a few hours.

Example 4: Silica-Gel Encapsulation of BSA

Silica gel (Petco crystal cat litter) is mixed with 10% by weight of BW70 from HA international (approximately 70% by weight benzenesulfonic acid in water) and the mixture is allowed to dry in ambient air until it flowed like a dry granular substance, thereby yielding a first reactive component. This mixture is tested by mixing 50% by weight with 50% by weight of furfuryl alcohol (second reactive component) (Chem-Rez Fury 454 from ASK Chemicals.) The reaction is immediate and vigorous, causing solidification of the furfuryl alcohol with evolution of heat.

The quantities of reagents listed in Example 2 above are chosen such that one molar quantity of sulfuric acid reacts with each molar quantity of dehydroglucose ($C_6H_{10}O_5$) residues including the sample of cellulose. This mixture is dispersed in silica sand at 10 wt. percent as a means to dissipate the heat of reaction. The product of this reaction is a humus-colored acetone-moist mixture that could be handled as a loose dried powder after the acetone had been allowed to evaporate. The material is dispersed as a granular solid in another 98 wt. % of silica sand. Although roughly 1.8% of the total sand is bonded to the reactive polymer, the remainder is not. The mixing process fails to fully disperse the sandy humus-colored product in the dry sand, so the distance between grains of reactive product is around 2-3 mm. On printing in a 3D printer, the entire printed area turns green during the first hour after patterning, finally solidifying in about three hours. This indicates that a bulk reaction is occurring throughout the mixture though the humus-colored product was still observable as discrete grains in the part.

Example 5: Bare Sulfated Cellulose

As an alternative to example 2, bamboo fiber (Sanacel, CFF GmbH) was reacted with a mixture of acetone and sulfuric acid in the following manner: 24 g of acetone was combined with 12 g of concentrated sulfuric acid. This solution was added to 20 g of cellulose. The combined mixture was covered and allowed to stand overnight. The product was then uncovered and allowed to dry overnight.

The product was tested by combining 0.5 g of this product with 50 g silica sand as a dry mixture, then 1 g furfuryl alcohol was added (Chem-Rez Fury 454 from ASK Chemicals with 0.02% Surfynol 465 from Air Products). The mixture reacted and solidified in about an hour.

Example 6: Sulfated Charcoal

This version provides an example of a system containing only pure carbon as a substrate. Activated charcoal (100 mesh, DARCO, Sigma-Aldrich) was reacted with a mixture of acetone and sulfuric acid in the following manner: 24 g of acetone was combined with 12 g of concentrated sulfuric acid. This solution was added to 20 g of charcoal. The combined mixture was covered and allowed to stand overnight. The product was then uncovered and allowed to dry overnight.

The product was tested by combining 0.5 g of this product with 50 g silica sand as a dry mixture, then 1 g furfuryl alcohol was added (Chem-Rez Fury 454 from ASK Chemicals with 0.02% Surfynol 465 from Air Products). The mixture reacted and solidified in about a half hour.

In an embodiment, additional carbohydrates such as starch, alginate, pectin, quebracho powder, gum arabic, guar, tragacanth, xanthan, carrageenan, and various cellulose derivatives such as carboxymethylcellulose, methyl cellulose, ethyl hydroxyethyl cellulose, hydroxypropyl cellulose, and/or various carbohydrate analogs such as hydroxypropyl tapioca may be added to the granular mixture as thickeners to control bleed or as co-reagents with the furan monomers as part of the second reactive component to strengthen or to modify the reaction rate, adhesion, or elasticity of the final product.

In an embodiment, a tannin, a polymeric tannin, a proanthocyanidin, or a phenolic polymer may also be used as a co-reactant with sulfuric acid to form a dry reagent used as the first reactive component in embodiments of the invention. Hydroxy groups in phenols and tannins are more labile than the hydroxy groups in carbohydrates, and therefore a more dilute form of sulfuric acid will exhibit the same degree of reaction with a lesser amount of hydrolysis. As a strategy for balancing the reactivity of the first reactive component with its solubility in the second reactive component to control bleed, blends of these substances are quite useful.

In an embodiment, a first particulate component, e.g., an absorbent particulate material (e.g., silica sand, silica gel, fire clay, or some other porous granular ceramic, or a polymeric organic material chosen from the groups listed above) is combined with a reactive component that has been encapsulated in a solid, microporous particle whose external characteristics cause it to behave as a dry particulate to create a second particulate component. The second particulate component is subsequently mixed with a second reactive component that is dispensed in a pattern, e.g., as a binder by ink-jet printing. The liquid binder is allowed to come substantially to rest in a configuration determined by the minimization of surface area and equilibrium of fluid pressure throughout the printed body. Following this, the first reactive component is allowed to diffuse from its encapsulating media at a rate determined by the microporous structure of the media. Reaction between the first and second reactive components proceeds to completion at ambient temperature in a time that is sufficiently long for capillary stresses to be substantially relieved (roughly 10 minutes), but sufficiently short so as not to delay the production of large, industrially significant molds and cores (roughly 2 hours and more.)

Besides expanding the set of candidate reactive materials to include ones that would otherwise react too quickly, methods in accordance with embodiments of the invention permit the porosity of the sand structure to be controlled independently of the quantity of first reactive component added to the sand. If the highest possible density of product is desired, then the material will most probably be used dry. If greater amounts of porosity is desired, a third component may be added to the sand mixture that imparts cohesion to the sand without causing premature release of the encapsulated reactive component. An example of this would be a nonpolar liquid such as isopropyl myristate that wets the sand but repels an aqueous or hydrophilic reactive component such as benzenesulfonic acid, used as a catalyst for a second reactive component, e.g., furfuryl alcohol, printed though an ink jet printhead.

It will be readily apparent to those versed in the art that the term "sand" when applied to metal-casting technology may refer to a variety of materials including, but not limited to silica, amorphous silica, olivine, zirconium silicate, zirconia, chromite, mullite, alumina, aluminosilicate, chamotte, glass, gypsum, kieserite, limestone, dolomite, clay, fireclay, cement, sodium silicate, calcium silicate, magnesium silicate, calcium aluminate, magnesium aluminate, iron oxide, titanium dioxide, spinel, magnesia, garnet, forsterite, perovskite, staurolite, silicon carbide, boron carbide, boron nitride, vermiculite, rockwool, asbestos, silica gel, alumina gel, zirconia gel, carbon, amorphous carbon, and carbon nanotubes.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

What is claimed is:
1. A method for forming a solid object, the method comprising the steps of:

a. providing a first mixture comprising a first particulate component and at least one selected from the group consisting of a carbohydrate, cellulose, starch, dextrin, tannin, phenolic polymer, polymeric tannin, proanthocyanidin, activated carbon, catechol and derivatives thereof;
b. providing an acid;
c. combining the first mixture and the acid to react the acid and the at least one selected from the group consisting of a carbohydrate, cellulose, starch, dextrin, tannin, phenolic polymer, polymeric tannin, proanthocyanidin, activated carbon, catechol and derivatives thereof to form a first reactive component, wherein the first reactive component is a particulate comprising a dry oligomeric catalyst that is chemically distinct from the acid and the at least one selected from the group consisting of a carbohydrate, cellulose, starch, dextrin, tannin, phenolic polymer, polymeric tannin, proanthocyanidin, activated carbon, catechol and derivatives thereof;
d. dispensing a substantially flat layer of the first reactive component onto a build surface; and
e. applying a liquid binder comprising a second reactive component onto at least a portion of the flat layer.

2. The method of claim 1, wherein the first particulate component is a refractory material selected from the group consisting of silica, sand, a silicate mineral, a silicate glass, a synthetic ceramic, a fibrous ceramic, a granulated porous ceramic, and a non-silicate mineral.

3. The method of claim 2 wherein the refractory material is a silicate mineral selected from the group consisting of olivine, zirconium silicate, magnesium silicate, calcium silicate, aluminum silicate, mullite, sodium silicate, spinel, garnet, and perovskite.

4. The method of claim 2, wherein the refractory material is a silicate glass selected from the group consisting of fused silica, soda-lime glass, e-glass, borosilicate glass, fused staurolite, and fused aluminosilicate.

5. The method of claim 2, wherein the refractory material is a synthetic ceramic selected from the group consisting of sodium silicate, Portland cement, calcium aluminate cement, synthetic staurolite, synthetic spinel, and synthetic garnet, silicon carbide, silicon nitride, boron carbide, graphite and amorphous carbon.

6. The method of claim 2, wherein the refractory material is a fibrous ceramic selected from the group consisting of glass fiber, fused silica fiber, aluminosilicate fiber, silicon carbide fiber, rock wool, zirconium silicate fiber, asbestos and Wollastonite.

7. The method of claim 2, wherein the refractory material is a granulated porous ceramic selected from the group consisting of silica gel, alumina gel, aluminosilicate gel, zeolite, zirconia gel, clay, bentonite, fireclay ceramic powder, powdered earthenware, chamotte, grog, frit, vermiculite, cinders, calcined bone, and diatomaceous earth.

8. The method of claim 2, wherein the refractory material is a non-silicate mineral selected from the group consisting of gypsum, kieserite, limestone, dolomite, magnesium aluminate, calcium aluminate, iron oxide, titanium dioxide, chromite, forsterite, and magnesia.

9. The method of claim 1, wherein the acid is sulfuric acid, the step of providing an acid comprises providing a second mixture comprising the sulfuric acid, and the first reactive component is manufactured by the steps of:
i. mixing sand and the at least one selected from the group consisting of a carbohydrate, cellulose, starch, dextrin, tannin, phenolic polymer, polymeric tannin, proanthocyanidin, activated carbon, catechol and derivatives thereof to form the first mixture;
ii. mixing the sulfuric acid, the sand, and a polar organic solvent to form the second mixture;
iii. combining the first and second mixtures to form a combined mixture;
iv. allowing the first and second mixtures in the combined mixture to react; and
v. drying the organic solvent from the combined mixture to form the first reactive component.

10. The method of claim 9, wherein the polar organic solvent is selected from the group consisting of an alcohol, a ketone, an acid anhydride, a tertiary amine, an amide, and a chlorinated solvent.

11. The method of claim 10, wherein the polar organic solvent is an alcohol selected from the group consisting of methanol, ethanol and isopropanol.

12. The method of claim 10, wherein the polar organic solvent is a ketone selected from the group consisting of acetone and methyl ethyl ketone.

13. The method of claim 10, wherein the polar organic solvent is an acid anhydride selected from the group consisting of acetic anhydride and succinic anhydride.

14. The method of claim 10, wherein the polar organic solvent is a tertiary amine selected from the group consisting of pyridine and picoline.

15. The method of claim 10, wherein the polar organic solvent is an amide that comprises dimethylformamide.

16. The method of claim 10, wherein the polar organic solvent is a chlorinated solvent selected from the group consisting of chloroform, dichloromethane, and trichloroethylene.

17. The method of claim 1, wherein the acid is chlorosulfonic acid.

18. The method of claim 1, wherein the step of providing an acid comprises providing a second mixture comprising the acid, and the second mixture further comprises a second particulate component.

19. The method of claim 18, wherein the acid is selected from the group consisting of sulfurous acid, sulfuric acid, benzenesulfonic acid, xylenesulfonic acid, methanesulfonic acid, and toluenesulfonic acid.

20. The method of claim 1, wherein the second reactive component comprises a furan monomer.

21. The method of claim 1, wherein the liquid binder further comprises a surfactant.

22. A method for forming a solid object, the method comprising the steps of:
a. providing a first particulate component comprising a refractory material;
b. providing a second particulate component comprising a first reactive component encapsulated in a microporous media wherein mechanical characteristics of the second particulate component do not impart cohesion to the first particulate component;
c. mixing the first particulate component and the second particulate component to form a mixture;
d. dispensing a substantially flat layer of the mixture onto a build surface; and
e. applying a second reactive component comprising a furan monomer, to at least a portion of the substantially flat layer.

23. The method of claim 22, wherein the microporous encapsulating media is selected from the group consisting of microcrystalline cellulose, a furan-soluble polymer derived from a carbohydrate, polyethylene oxide, a vinyl polymer, rosin, phenolic polymers, tannins, cellulose esters, cellulose ethers, carbohydrate derivatives of ester, carbohydrate derivatives of ether, activated carbon and an oligomeric carbohydrate.

24. The method of claim 23, wherein the microporous encapsulating media is a vinyl polymer selected from the group consisting of polyvinyl pyrrolidone ("PVP"), PVP copolymerized with vinyl acetate, butylated PVP, polyvinyl acetate, polyvinyl alcohol, and polyvinyl butyral.

25. The method of claim 23, wherein the microporous encapsulating media is at least one selected from the cellulose esters and cellulose ethers, and the at least one selected from the cellulose esters and cellulose ethers is selected from the group consisting of cellulose acetate, nitrocellulose, methyl cellulose, hydroxypropyl cellulose and ethyl hydroxyethyl cellulose.

26. The method of claim 23, wherein the microporous encapsulating media is at least one of selected from the carbohydrate derivatives of ester and carbohydrate derivatives of ether derived from a material selected from the group consisting of starch, dextrin, alginate, pectin, and vegetable gum.

27. The method of claim 26, wherein the at least one selected from the carbohydrate derivatives of ester and the carbohydrate derivatives of ether is a vegetable gum selected from the group consisting of gum Arabic and guar.

28. The method of claim 23, wherein the microporous encapsulating media is an oligomeric carbohydrate is selected from the group consisting of starch, dextrin, hemicellulose and cellulose hydrolyzed with strong acids.

29. The method of claim 22, wherein the first reactive component is selected from the group consisting of sulfuric acid, sulfurous acid, toluenesulfonic acid, xylenesulfonic acid, methanesulfonic acid, and benzenesulfonic acid.

30. A method of forming a material system for 3D printing, the method comprising the steps of:
a. forming a first mixture comprising an acid, sand, and an organic solvent, wherein the organic solvent is selected from the group consisting of acetone, acetic anhydride, alcohol, methanol, and isopropanol;
b. forming a second mixture comprising a carbohydrate and sand;
c. combining the first and second mixtures to form a combined mixture;
d. allowing the first and second mixtures in the combined mixture to react; and
e. drying the organic solvent from the combined mixture to form the first reactive component, the first reactive component comprising a dry oligomeric catalyst that is chemically distinct from the acid and the carbohydrate.

31. The material system of claim 30, wherein the acid is chlorosulfonic acid.

32. The method of claim 30, wherein the acid is selected from the group consisting of sulfuric acid, sulfurous acid, benzenesulfonic acid, xylenesulfonic acid, methanesulfonic acid, and toluenesulfonic acid.

33. The method of claim 30, further comprising:
dispensing a substantially flat layer of the first reactive component onto a build surface; and
applying a liquid binder including a second reactive component onto at least a portion of the substantially flat layer.

34. The method of claim 33, wherein the second reactive component comprises a furan monomer.

35. A method for forming a solid object, the method comprising the steps of:
a. preparing a first reactive component by reacting an acid with at least one selected from the group consisting of a carbohydrate, cellulose, starch, dextrin, tannin, phenolic polymer, polymeric tannin, proanthocyanidin, activated carbon, catechol and derivatives thereof, the first reactive component comprising a dry oligomeric catalyst that is chemically distinct from the acid and the at least one selected from the group consisting of a carbohydrate, cellulose, starch, dextrin, tannin, phenolic polymer, polymeric tannin, proanthocyanidin, activated carbon, catechol and derivatives thereof;
b. dispensing a substantially flat layer of the first reactive component onto a build surface; and
c. applying a liquid binder comprising a second reactive component onto at least a portion of the flat layer.

36. The method of claim 35, wherein the acid is not combined with a particulate component before the reacting step.

37. The method of claim 35, wherein the at least one selected from the group consisting of a carbohydrate, cellulose, starch, dextrin, tannin, phenolic polymer, polymeric tannin, proanthocyanidin, activated carbon, catechol and derivatives thereof is not combined with a particulate component before the reacting step.

38. The method of claim 35, wherein the acid is not combined with a particulate component before the reacting step, and the at least one selected from the group consisting of a carbohydrate, cellulose, starch, dextrin, tannin, phenolic polymer, polymeric tannin, proanthocyanidin, activated carbon, catechol and derivatives thereof is not combined with a particulate component before the reacting step.

39. The method of claim 35, wherein the first reactive component is a particulate component at the beginning of the applying a liquid binder step.

40. The method of claim 35, wherein the second reactive component is a furan monomer.

41. The method of claim 35, further comprising combining the first reactive component with a particulate component prior to the step of applying a liquid binder.

42. The method of claim 39, wherein the particulate component is a refractory particulate component.

43. The method of claim 22, wherein the microporous encapsulating media is activated carbon and the first reactive component is sulfuric acid.

* * * * *